Aug. 12, 1958 W. T. GRAY 2,846,882
APPARATUS FOR MEASURING AND/OR CONTROLLING SURFACE
TEMPERATURES UNDER NON-BLACK-BODY CONDITIONS
Filed Sept. 20, 1952 4 Sheets-Sheet 1

INVENTOR.
WILLIAM T. GRAY
BY
Woodcock and Phelan
ATTORNEYS

Fig.5

Aug. 12, 1958 W. T. GRAY 2,846,882
APPARATUS FOR MEASURING AND/OR CONTROLLING SURFACE
TEMPERATURES UNDER NON-BLACK-BODY CONDITIONS
Filed Sept. 20, 1952 4 Sheets-Sheet 4

INVENTOR.
WILLIAM T. GRAY
BY
*Woodcock and Phelan*
ATTORNEYS

United States Patent Office 2,846,882
Patented Aug. 12, 1958

2,846,882

APPARATUS FOR MEASURING AND/OR CONTROLLING SURFACE TEMPERATURES UNDER NON-BLACK-BODY CONDITIONS

William T. Gray, Jenkintown, Pa., assignor to Leeds and Northrup Company, Philadelphia, Pa., a corporation of Pennsylvania Application September 20, 1952, Serial No. 310,696

12 Claims. (Cl. 73—355)

This invention relates to apparatus for measuring and/or controlling the temperature of a body from which radiant energy is emitted, and has for an object the provision of a temperature-measuring and control system of improved accuracy notwithstanding non-uniform emissivity of the surface whose temperature is to be measured and/or controlled.

More particularly, this invention relates to apparatus for determining the temperature of bodies having a surface of emissivity less than unity and under non-black-body conditions.

Heretofore the determination of the temperature of unenclosed non-black-body surfaces by radiant-energy responsive means has involved viewing the surface with an optical or total radiation pyrometer and introducing or applying a correction which very often is only approximate. Measurements made in accordance with the foregoing methods are in general subject to large errors because of the difficulty of determining the corrections to be applied. The particular corrections to be made will depend upon the character of the material under measurement and the conditions under which the measurements are made.

The foregoing will be particularly evident by considering a moving body such as sheet material in the course of manufacture, the new surface areas of which are continuously brought into range of view of a measuring device. The emissivity of such a body or work surface frequently changes in unpredictable manner because of physical differences in different areas of the work surface, changes due to the manufacturing operations, and changes in the surface viewed due to the presence of foreign materials, such as oxides, oils, waxes, dirt and the like, having emissivities differing from that of the underlying surface. Likewise the emissivity of most materials changes with change in the temperature.

A perfect radiator, or black body, is characterized by the fact that the energy which it emits depends only on the temperature of the body. A non-black-body radiator emits only a fraction of the energy emitted by a perfect radiator, the fraction being known as the emissivity of the body. The emissivity may refer to only a very narrow spectral range, such as is used in optical pyrometry, or a broad spectral range, such as is used in total radiation pyrometers. Thus, in order to relate the energy emitted by a non-black-body to temperature, the emissivity must be known. The emissivity of an opaque body is related to its reflectivity by the equation $E+R=1$. When the emissivity is unity, the reflectivity is zero. However, non-black bodies are partial reflectors and their emissivity can never be unity. The total energy leaving an area of a non-black-body surface will, in general, be partly emitted radiation and partly reflected radiation. Reflected radiation can cause temperature-measuring errors. For example, a sheet of white paper in daylight appears red hot when measured with an optical pyrometer. When the total of emitted and reflected radiation at every point in the spectral region to which the pyrometer is sensitive is the same as the radiation at every like point in the same spectral region as would be emitted by a black body at the same temperature, black-body conditions are said to exist.

Since in actual practice the opaque bodies or work surfaces whose temperatures are desired to be measured are not perfect black bodies, it follows that the radiation therefrom will not be due to the temperature of the work surfaces alone, since only a part of the radiation falling on them will be absorbed while the remainder will instead be reflected therefrom. Thus, the total radiant energy from a heated opaque work surface will be made up of two components, one due to emission which will be a fraction of the radiant energy which would be emitted from a black body at the same temperature as the work surface, and the other a reflected component due to the reflection of radiant energy from the work surface. When energy in each and all wavelengths utilized in actuating a radiant-energy responsive temperature-measuring means has been made to equal the corresponding energy emitted by a black body at the same temperature as the work surface, black-body temperature-measuring conditions will have been attained.

In order to avoid the need to apply corrections to measurements made with an optical or total radiation pyrometer, various methods have been employed for establishing black-body conditions so that the temperature measurements may be made under the established black-body conditions in avoidance of the foregoing errors. Examples of such systems are systems of the type disclosed in copending application Serial No. 142,886, filed February 7, 1950 by Raymond C. Machler, a coemployee of mine and issued June 10, 1958 as Patent No. 2,837,- 917; systems of the type disclosed in copending application Serial No. 142,807, filed February 7, 1950 by W. E. Phillips, Jr., a coemployee of mine now Patent No. 2,690,078, issued September 28, 1954; systems of the type disclosed is copending application Serial No. 142,795, filed February 7, 1950 by William G. Fastie now Patent No. 2,737,- 809, issued March 13, 1956; and systems of the type disclosed in my copending application Serial No. 142,799, filed February 7, 1950, now Patent No. 2,611,541, issued September 23, 1952, certain features of the aforesaid applications being disclosed herein and in themselves not forming part of the present invention.

In the foregoing systems of the copending applications, black-body measuring conditions have been established primarily by two methods. One method of establishing the black-body measuring condition has been to provide an illuminator having black-body radiating characteristics such that a beam of radiant energy derived directly therefrom will be of the same intensity as a beam of radiant energy from a black body at the same temperature. By positioning the illuminator adjacent the surface whose temperature is to be measured, the illuminator supplied to the work surface radiant energy for reflection therefrom to supplement the energy emitted by the work surface by a reflected component such that a beam of radiant energy comprising the total of the emitted and reflected components from the work surface would be substantially equal in intensity to a beam of radiant energy comprising solely the emitted radiation from the black-body illuminator.

The other method of establishing black-body measuring conditions has been to utilize an illuminator whose emissivity is less than unity, that is, a non-black-body illuminator and to establish the black-body measuring conditions by insuring that there are sufficient multiple reflections between the illuminator and the work surface whose temperature is to be measured such that radiation directed to a radiation pyrometer will include emitted radiant energy from the work surface and multiple reflected radiant energy, the component comprising the reflected radiant energy having been increased to a value such that the sum of the emitted and reflected radiant energy will be substantially equal to the radiant energy emitted by a black body at the same temperature.

Illuminators of the foregoing type, while they provide for accurate temperature measurement of work surfaces having non-uniform emissivity, nevertheless have certain disadvantages from a construction standpoint. For example, to provide a black-body illuminator, it is necessary to coat it with a ceramic or other material in order to make it a black body or perfect emitter. Needless to say, it is difficult to maintain an illuminator that is a perfect black body. In utilizing illuminators having an emissivity less than unity, it is necessary in order to establish black-body measuring conditions either to use a relatively large illuminator such that there may be many reflections, upwards of twenty, between the illuminator and the work surface in order to increase the intensity of the reflector component, or it is necessary to provide the non-black-body illuminator with a peripheral edge formed in a manner such that there will be prevented the egress of the radiant energy emitted and reflected between the illuminator and the work surface, the latter construction being more fully described in my copending application Serial No. 142,799, now Patent 2,611,541.

In accordance with the present invention, it is not necessary that the illuminator be a black body nor is it necessary that the illuminator be of size sufficient to permit multiple reflections between the illuminator and the work surface whose temperature is to be measured. It is only necessary that the illuminator be of sufficient size to permit a single reflection between the illuminator and a limited area of the work surface. Thus, a metal illuminator may be used in the present invention without the necessity of coating it with a ceramic or other material to make it a black body or perfect emitter. This provides for easier construction of an illuminator for high temperatures since in many instances black-body surfaces on illuminators, while satisfactory for relatively low-temperature measurements, have proved unsatisfactory for high-temperature measurements due to the destruction of the black-body character of the surface at high temperatures.

A further advantage of the present invention is that there may be utilized a "fast" illuminator, that is to say, an illuminator having a time constant of approximately one second or less. For example, a thin strip of platinum may be used as the illuminator, the strip being heated by passing a current therethrough. The time constant of the thin strip of platinum or "fast" illuminator will be in the order of only a second, and when used with "fast" radiant-energy detectors, also having a short time constant, rapid changes of the temperature of the surface under measurement can be followed.

In carrying out the present invention in one form thereof, the equality of temperatures of two separate surfaces of emissivity less than unity may be determined under non-black-body conditions by disposing one surface adjacent the other surface for interchange of radiant energy between the surfaces. Radiant-energy responsive means then may be disposed with respect to the surfaces for receipt from opposed areas thereof of separate beams of radiation, one of the beams comprising radiant energy emitted by a limited area of the one surface and radiant energy emitted by the other surface and reflected from the limited area of the one surface, the other beam comprising radiant energy emitted by the other surface and radiant energy emitted by the limited area of the one surface and reflected from the other surface. The intensities of these beams of radiant energy may be compared and the temperature of one of the surfaces varied until the intensities of the beams are equal, at which time the temperatures of both surfaces will be equal.

Further in accordance with the present invention, there may be provided a radiation pyrometer independent of emissivity for measuring the true surface temperature of a heated work surface. The pyrometer system includes an illuminator plate having an emissivity less than unity and means for supporting the plate with one surface thereof adjacent a limited area of the heated work surface. The radiation pyrometer further includes radiant-energy responsive means disposed separately to view the one surface of the plate and the limited area of the work surface, the relative disposition of the radiant-energy responsive means, the plate and the work surface being such that the beam of radiant energy received by the radiant-energy responsive means from the limited area of the work surface comprises radiant energy emitted thereby and radiant energy emitted by the adjacent surface of the plate and reflected from the limited area; the beam of radiant energy received by the radiant-energy responsive means from the plate comprising radiant energy emitted thereby and radiant energy emitted by the limited area and reflected from the plate. The illuminator plate is adapted for heating to change its uniform temperature for establishing equality between the aforesaid beams of radiant energy and is provided with temperature-sensitive means for measuring its temperature as a replica of the true temperature of the work surface.

For a more detailed description of the invention and for further objects and advantages thereof, reference is to be had to the following description taken in conjunction with the accompanying drawings, in which.

Figure 1:
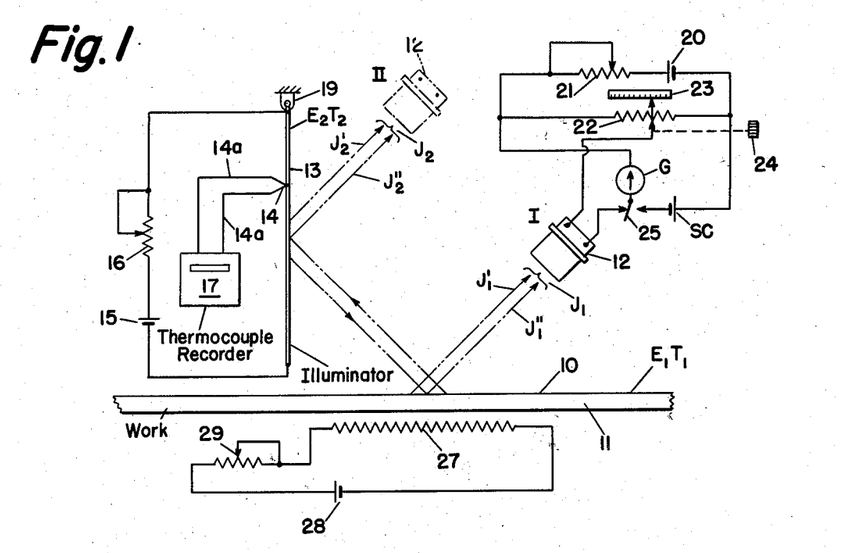
Fig. 1 is an explanatory illustration of the invention and diagrammatically illustrates one embodiment of the invention.

Referring to Fig. 1 of the drawings, the invention in one form has been diagrammatically illustrated as applied to the measurement of the temperature of a surface 10 of a heated body or work 11 which may be in the form of a traveling strip of material, though the invention is equally applicable to stationary work. The emissivity $E_1$ of the surface 10 will ordinarily be less than unity, and thus, a radiation-responsive device 12 which may be, for example, of the type disclosed in Dike Patent No. 2,232,594, such as a total radiation pyrometer having a sensitive element receiving radiant energy directly from the surface 10, will produce an output which will vary with change in the emissivity of the surface, and as already explained, such variations do occur and cause considerable error. In addition, it is necessary to apply a corrective factor for a given emissivity of the surface 10, the difficulty of applying the correct factor being magnified because of change in the emissivity of different areas of surface 10 viewed by device 12.

However, by locating a radiant-energy illuminator 13 having a surface emissivity $E_2$ of less than unity in such relation to surface 10 as to produce a single reflection of radiant energy between the surface 10 and the illuminator 13, there will be included in the radiant energy received by the radiation pyrometer 12 at stations I and II a reflection component. In other words, the radiant-energy beam $J_1$ directed to a radiant-energy sensitive device at station I will comprise radiant energy $J_1'$ emitted by a limited area of the work surface 10 and radiant energy $J_1''$ emitted by the surface of illuminator 13 and reflected from the limited area of the work surface 10. Similarly, the radiant-energy beam $J_2$ directed to a radiant-energy sensitive device at station II will comprise radiant energy $J_2'$ emitted by the illuminator surface 13 and radiant energy $J_2''$ emitted by the limited area of the work surface 10 and reflected from the illuminator surface 13.

The radiant energy received by a radiant-energy detector at station I may be considered as proportional to $J_1$ and may be expressed mathematically in accordance with the well-known Stefan-Boltzmann law of radiation by the equation:

$$J_1 = J_1' + J_1'' = E_1 k T_1^4 + (1-E_1) E_2 k T_2^4 \quad (1)$$

where $J_1'$ represents the radiant energy emitted by the work surface 10,
$J_1''$ represents the radiant energy emitted by the illuminator surface 13 and reflected by the work surface 10,
$E_1$ is the emissivity of the surface 10,
$T_1$ is the absolute temperature of the work surface 10,
$E_2$ is the emissivity of the illuminator 13,
$T_2$ is the absolute temperature of the illuminator 13, and
$k$ is the Stefan-Boltzmann universal radiation constant whose value depends on the units used.

Similarly, the radiant energy received by the radiant-energy detector at station II is proportional, with the same constant of proportionality referred to above, to $J_2$ and may be expressed mathematically by the equation:

$$J_2 = J_2' + J_2'' = E_2 k T_2^4 + (1-E_2) E_1 k T_1^4 \quad (2)$$

where $J_2'$ represents the radiant energy emitted by the illuminator surface 13 and
$J_2''$ represents the radiant energy emitted by the work surface 10 and reflected by the illuminator surface 13.

As may be seen from the following, the radiant energy $J_1$ received by the radiant-energy detector at station I will be equal to the radiant energy $J_2$ received by the radiant-energy detector at station II when the temperature $T_1$ and $T_2$ of the corresponding surfaces 10 and 13 are equal. When $T_1 = T_2$, then $T_1$ may be substituted for $T_2$ in Equations 1 and 2 and written as follows in Equations 3 and 4 respectively:

$$J_1 = J_1' + J_1'' = E_1 k T_1^4 + (1-E_1) E_2 k T_1^4 \quad (3)$$

$$J_2 = J_2' + J_2'' = E_2 k T_1^4 + (1-E_2) E_1 k T_1^4 \quad (4)$$

Equation 3 may be further simplified as follows:

$$J_1 = E_1 k T_1^4 + E_2 k T_1^4 - E_1 E_2 k T_1^4 \quad (5)$$

Also Equation 4 may be further simplified as follows:

$$J_2 = E_2 k T_1^4 + E_1 k T_1^4 - E_2 E_1 k T_1^4 \quad (6)$$

Thus by inspection of Equations 5 and 6 it will be seen that when $T_1$ is equal to $T_2$ then $$J_1 = J_2 \quad (7)$$

and this relationship will be true regardless of the emissivity values $E_1$ and $E_2$ respectively of the work and illuminator surfaces. More particularly, when the radiant energy received by a detector at station I is equal to the radiant energy received by a detector at station II then the temperature of work surface 10 will be equal to the temperature of the illuminator surface 13. By providing the illuminator 13 with a thermo-couple 14, the true temperature of one of the surfaces will always be known. Thus when the radiant energy $J_1$ is equal to the radiant energy $J_2$, the known temperature of the one surface will be the same or a replica of the temperature of the other surface.

In Fig. 1, the illuminator 13 may comprise a plate having an internal heating element or preferably it may itself be the heating element, such for example as a thin strip of platinum heated by passing a current through it. The latter construction has the additional advantage of having a short time constant of the order of a second or less and when used in connection with fast detectors having a short time constant, rapid changes of the temperature of the work surface 10 can be followed. The illuminator 13 has been illustrated in Fig. 1 as being energized by a source 15 for uniform heating under the control of a heat-regulating device such as the variable resistor 16. Provision has been made in the arrangement of Fig. 1 whereby the radiation pyrometer 12 may be moved from a first position at station I for viewing the work surface 10 and then to a second position at station II for viewing the illuminator surface 13. It is to be emphasized that the illuminator 13 must be so positioned with respect to the work surface 10, as by supporting means 19, that when the pyrometer 12 is at station I, it will receive radiation emitted directly from the work surface 10 and also radiation emitted by the illuminator 13 and reflected from the work surface 10. Likewise when the pyrometer 12 is at station II it must receive radiation emitted by the illuminator 13 and radiation emitted by the work surface 10 and reflected from the illuminator 13. The radiation pyrometer 12 is connected in a measuring circuit, of any suitable type, and shown as comprising a potentiometer including a source of supply 20, a variable resistor 21, slidewire 22 with associated scale 23, an adjusting knob 24 for slidewire 22 and the index for scale 23, and a measuring instrument illustrated as galvanometer G. A standard cell SC may be provided for calibrating or standardizing the network with a transfer switch 25 in its right-hand position. The leads 14a from the thermocouple 14 are connected to a thermocouple recorder 17, of any suitable type, for example of the type disclosed in Williams Jr. Patent Number 2,367,746, or of the type described more in detail in connection with Fig. 5.

Briefly, the operation is as follows. With the radiant-energy detector 12 at station I, the knob 24 is turned to adjust the slidewire 22 to produce zero deflection of the galvanometer G. The detector 12 is then moved to its second position at station II. If the galvanometer G deflects from its zero position, preferably midway of its scale, an indication will be had that the radiant-energy beam $J_2$ received by the detector at station II is not equal to the radiant energy received when the detector was at station I. If the radiant energy is less, the deflection will be in one direction, and if it is greater the deflection will be in the opposite direction. Accordingly the resistor or control device 16 associated with illuminator 13 is adjusted until the radiant energy received by the detector or radiation pyrometer 12 at station I is the same as at station II. Of course with each adjustment of control device 16, a new adjustment of slidewire 22 by knob 24 will be required. When the zero deflection of the galvanometer is maintained upon movement of the radiation pyrometer from station I to station II or vice versa, then the radiant-energy beam $J_1$ at station I will be equal to the radiant-energy beam $J_2$ at station II. However, it is to be noted that the reading on the scale 23 will not be the true temperature of either the work surface 10 or the illuminator 13 as the foregoing balance was attained under non-blackbody conditions. The true temperature of both the illuminator 13 and the work surface 10, however, may be read directly from the thermocouple recorder 17.

The scale 23 may be calibrated in any suitable manner such as from zero to one hundred with the scale indicating at balance not the temperature of the work surface or the illuminator but merely at what point on the scale balance was obtained. While in Fig. 1 the variable type of slidewire 22 has been diagrammatically illustrated as adjustable, it will be understood that the resistor element of slidewire 22 may be mounted upon a rotatable element for rotation relative to a fixed contact. The scale 23 may be either directly associated with the rotatable slidewire, or driving connections driven by knob 24 may be utilized to drive an indicator relative to an associated scale or to drive a pen relative to a chart.

The system of Fig. 1 is also applicable to controlling the temperature of work surface 10. For example, there may be provided a suitable heating supply for work surface 10 such as has been generically illustrated by a heater element 27. The heater element 27 is energized from a suitable source 28 and the heat supplied by element 27 being controlled, for example, by a variable control means 29. Thus the temperature of the illuminator 13 may be set to remain at a selected control temprature and the temperature of the work surface 10 may be varied by means of the adjustable supply 29 whenever there is an unbalance in the radiant energy received by the detector 12 at station I with respect to the radiation received by the detector at station II. Thus it will be seen that the arrangement of Fig. 1 is equally applicable to measuring and/or controlling surface temperature.

Figure 2:
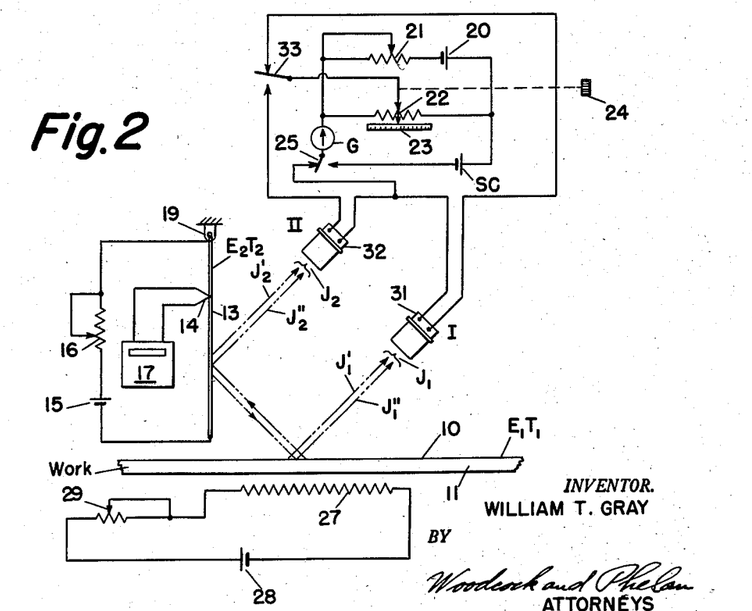
Fig. 2 diagrammatically illustrates a modification of the invention.

Inasmuch as it may be inconvenient to move the radiant-energy detector 12 of Fig. 1 from station I to station II and vice versa, since such arrangement will generally necessitate a suitable transfer means, the system of Fig. 2 may be preferred in which there are provided matched radiant-energy detectors or radiation pyrometers 31 and 32, of any suitable type, for example the type disclosed in the aforesaid Dike patent, the first receiving radiant energy $J_1$ at station I and the second receiving radiant energy $J_2$ at station II. By means of a transfer switch 33 the potential measuring circuit is connected first to the radiant-energy detector 31 and then to the radiant-energy detector 32. The radiant energy emitted by the illuminator 13 is varied by adjustment of resistor 16 and knob 24 is adjusted to balance the potentiometer measuring circuit. The related adjustments are continued until the galvanometer G remains at zero with either radiation pyrometer 31 or radiation pyrometer 32 connected to the measuring network. In the modification of Fig. 2 it will, of course, be understood that the radiation pyrometers or equivalent radiant-energy detectors 31 and 32 are matched as to their output characteristics as viewed by the measuring network. Both radiation pyrometers should be substantially free from the effect of ambient temperature since they may not be subject to exactly the same ambient temperature fluctuations.

While the invention has been described in connection with an arrangement where a single detector is used alternately in two positions with the temperature of one of the surfaces, either the work surface 10 or the illuminator surface 13, being adjusted so that the output of the detector is the same in the two positions, or by an arrangement using two detectors having matched output characteristics and alternately comparing the output of the detector at station I with the output of the detector at station II, a further arrangement may be utilized wherein two detectors are connected differentially or in series-opposition. With an arrangement of this type the net signal from the detectors will be proportional to the difference in the intensity of the beam of radiant energy emitted by the work surface 10 and emitted by the illuminator 13 and reflected from the work surface 10 and the intensity of the beam of radiant energy emitted by illuminator 13 and emitted by the work surface 10 and reflected from the illuminator 13. The foregoing relationship may be expressed mathematically by the following equation:

$$J_0 = J_1 - J_2 \qquad (8)$$

By substituting in Equation 8 the corresponding expressions for $J_1$ and $J_2$ from Equations 1 and 2, an Equation 9 may be written as follows:

$$J_0 = E_1 k T_1^4 + (1-E_1) E_2 k T_2^4 \\ - E_2 k T_2^4 - (1-E_2) E_1 k T_1^4 \qquad (9)$$

which may be simplified in the following manner:

$$J_0 = E_1 E_2 k (T_1^4 - T_2^4) \qquad (10)$$

As may be seen from Equation 10 when the output $J_0$ of the detectors is zero, $T_1$ will equal $T_2$ and the temperature of the work surface 10 will be the same as that of the illuminator surface 13.

Figure 3:
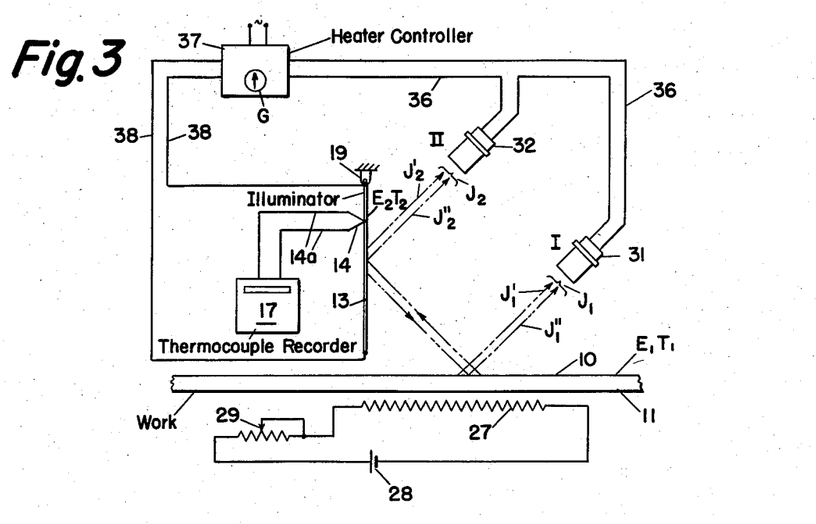
Fig. 3 diagrammatically illustrates a further modification of the invention.

The foregoing differential arrangement may be seen by reference to the modification illustrated in Fig. 3. While the present invention has been described so far in connection with manually operable systems for measuring and/or controlling the temperature of a work surface, it is to be understood that it is also applicable to automatic measuring and/or controlling systems. One form of an automatic measuring system has been shown in Fig. 3 in which the matched total radiation pyrometers or equivalent radiant-energy detectors 31 and 32 have been differentially connected, that is connected in series-opposition. As previously explained in connection with Fig. 2, the detector 31 will receive a radiant-energy beam $J_1$ and the detector 32 will receive a radiant-energy beam $J_2$. The output leads 36 from the differentially connected detectors are connected to a heater controller which has been diagrammatically illustrated by the rectangle 37 and which may be of any suitable type, such for example as the type disclosed in copending application Serial No. 142,886, or of the type described more in detail in connection with Fig. 5. Leads 38 from illuminator 13 are also connected to the heater controller 37. Whenever unequal intensities of radiant energy are received by the radiant-energy detectors 31 and 32, the heater controller 37 varies the input to the illuminator 13 in such a direction and to such an extent as may be necessary to equalize the intensities of the effective radiant energy received by each of the detectors 31 and 32. When the intensities of the radiant energy received by the detectors 31 and 32 are equal, the input to the illuminator 13 will remain constant until such time as a condition of inequality again exists. The thermocouple 14 is in good thermal-conductive relation with the surface of illuminator 13. When equal intensities of radiant energy are received by detectors 31 and 32, as will be indicated by a null deflection of the detector or galvanometer G, the illuminator 13 and work surface 10 will be at the same temperature. Therefore, the temperature of the illuminator may be measured and read directly from the thermocouple recorder 17, and such measurement will be a replica of the temperature of the work 11.

It will be understood that all of the modifications of this invention have the advantage of making the temperature measurement independent of the existence of blackbody conditions and independent of the presence or absence of media such as smoke, fumes and the like between the radiant-energy detectors, the illuminator and the work surface. In each of the modifications, it is to be understood that the radiant energy detectors are placed close together in order that the paths for the radiant energy thereto will be equally affected by intervening media. The measurement of the temperature of the work surface is unaffected by such intervening media, since the sole function of the detectors and the associated controllers is to control the temperature of either the work surface or the illuminator until the beams of radiant energy received by the detectors are equal. When said condition of equality exists, the true temperature of both surfaces will be indicated and/or recorded by the measuring device 17 associated with the thermocouple 14.

The present invention is not only applicable to automatic temperature measuring systems, but is also applicable to systems for automatically controlling the temperature of a work surface. One form of automatic temperature control system employing the present invention has been shown in Fig. 4. In this system, the differentially connected radiant-energy detectors 31 and 32 have been connected by the output leads 36, 36 to an automatic controller for controlling the temperature of the work which has been diagrammatically illustrated by rectangle 40. The radiant energy detectors or radiation pyrometers 31 and 32 will be positioned in the same manner as set forth in connection with Figs. 2 and 3. In this modification, the leads 14a, 14a of the thermocouple 14 from the illuminator 13 are both connected to a heater controller which has been diagrammatically illustrated by rectangle 41.

Figure 4:
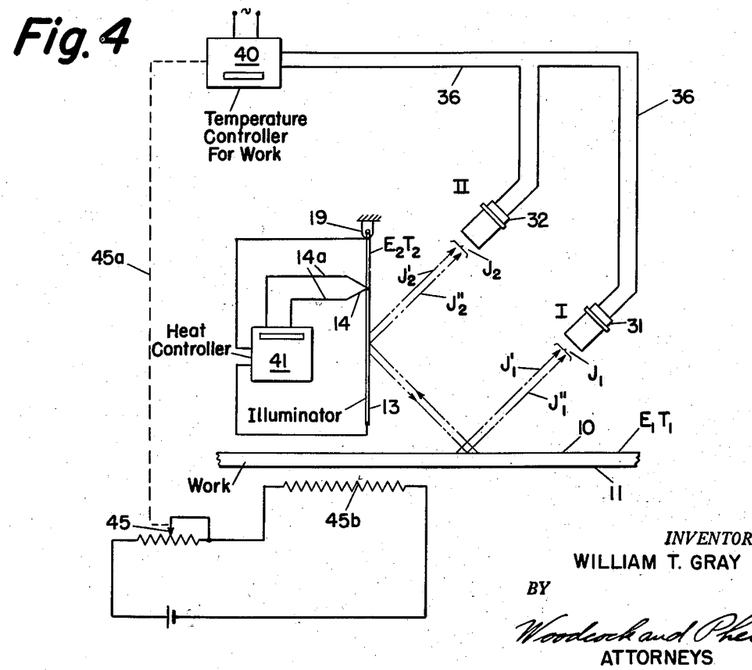
Fig. 4 diagrammatically illustrates the modification illustrated in Fig. 3 as particularly adapted to automatic temperature control.

While the temperature controllers for the work surface 10 and the illuminator 13 have been diagrammatically illustrated by the rectangles 40 and 41 in Fig. 4, they may be of any suitable construction known to those skilled in the art and may be provided with any suitable control system such for example as a control system of the proportional or position-adjusting type, as disclosed in Davis Patent No. 2,300,537 or of the duration-adjusting type also shown in the above-mentioned Davis patent and in the Davis Patent No. 2,325,232, or they may be of the type disclosed in copending application Serial No. 142,886.

The temperature at which the work surface is to be controlled may be preselected and the temperature of the illuminator 13 is then brought up to the preselected temperature by varying the energization of the illuminator. The thermocouple 14 is in good thermal contact with the surface of illuminator 13 adjacent the work surface 10 and provides a direct indication of the illuminator temperature. When the temperature of the illuminator 13 deviates from the preselected magnitude, such deviation is immediately detected by the thermocouple 14, which in turn conditions the heater controller 41 for returning the temperature of the illuminator to the original preselected magnitude. In this manner, the temperature of illuminator 13 is maintained at a preselected value.

As long as the intensity of the radiant energy $J_2$ received by the pyrometer 32 at station II is equal to the intensity of the radiant energy $J_1$ received by the pyrometer 31 at station I, the temperature of the illuminator 13 and the temperature of the work surface 10 are equal to each other and to the preselected magnitude. When the temperature of the work surface 10 deviates from the preselected magnitude, such deviation will be detected as a result of lack of equality in the effective radiant-energy beams $J_1$ and $J_2$, thus actuating the controller 40 and a correction will automatically be made in the heat supply to the work surface 10 as indicated by the control device 45 actuated through mechanical connection 45a. This correction will be made in the direction and to the extent necessary to bring the temperature of the work surface 10 back to the preselected temperature. The radiation pyrometers 31 and 32 will again receive equal intensities of radiant energy.

Figure 6:
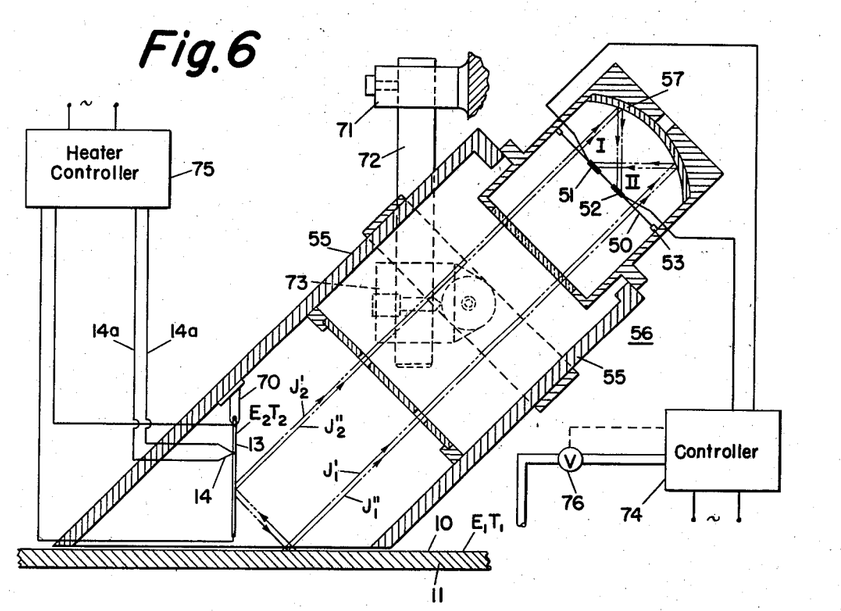
Fig. 6 diagrammatically illustrates the modification of Fig. 5 as applied to automatic temperature control.

The source of heat supply for the work surface 10 may be of any suitable form, for example, such as steam or electric heating. In the case of steam heating, the supply of steam may be controlled by means of a valve 76 in the supply line, as illustrated in Fig. 6. In the case of electric heating, variable heating resistors, as illustrated in Figs. 1 and 4, may be utilized to vary the generation of heat. The mechanical connection 45a (Fig. 4) is connected so as to adjust resistor 45 to vary the energization of the heating coils or resistors 45b.

Figure 5:
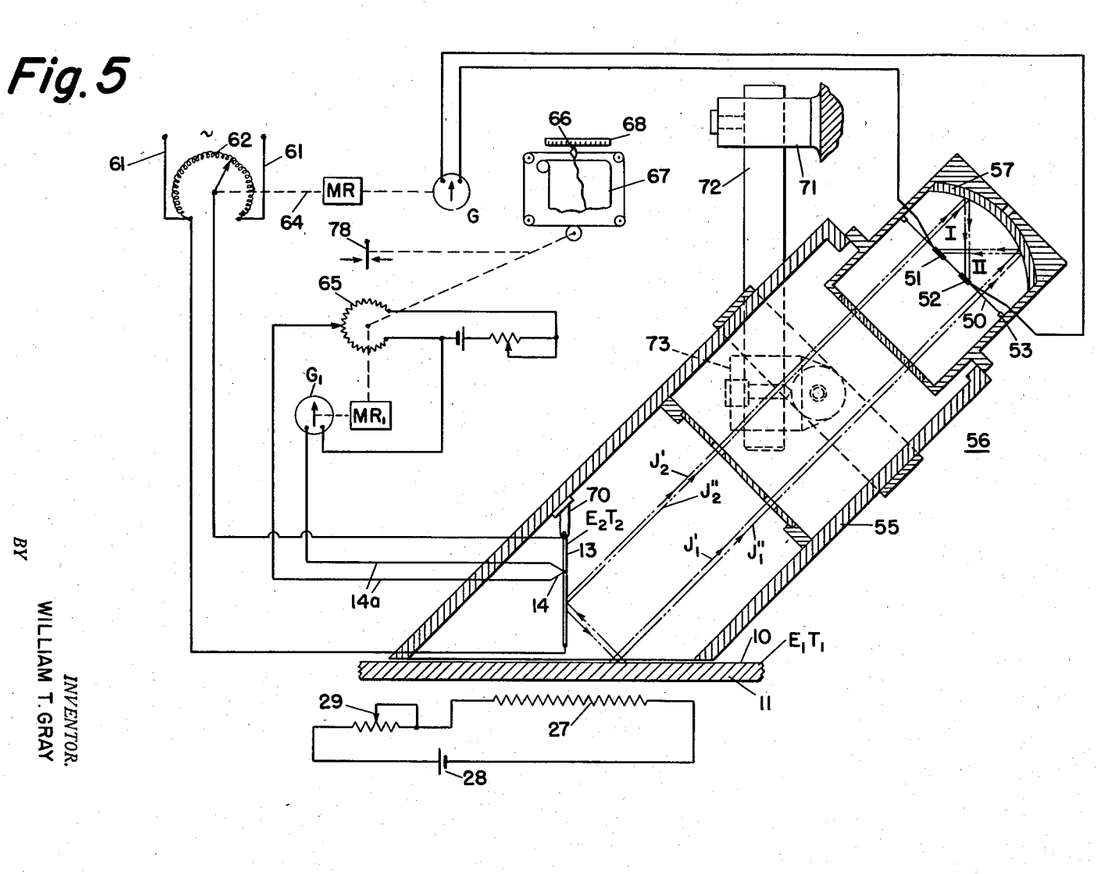
Fig. 5 diagrammatically illustrates a further modification of the invention utilizing a double beam radiation pyrometer.

In Fig. 5 there is illustrated a further modification of the present invention wherein the differentially-connected radiation pyrometers 31 and 32 of Fig. 3 have been replaced by a single instrument 56 including a differential thermopile having two target areas 51 and 52 respectively.

Figures 7, 8:
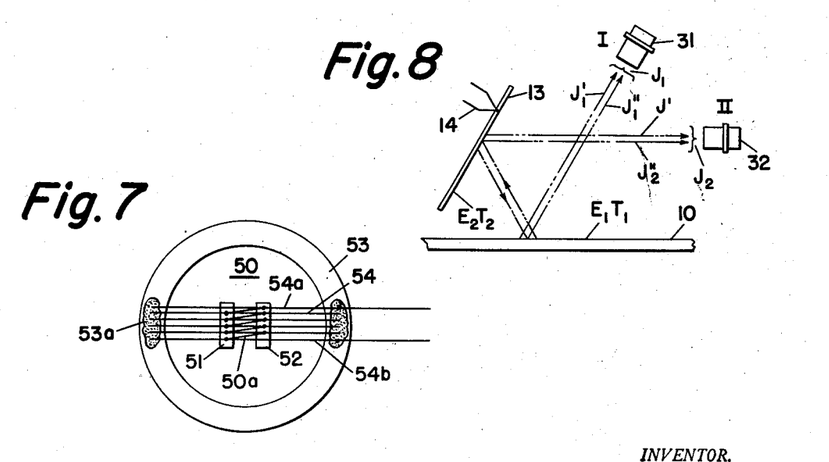
Fig. 7 is a plan view of the differential radiation-sensitive device of Figs. 5 and 6.
Fig. 8 is an explanatory illustration of a further modification of the invention.

The sensitive element or thermopile 50 is shown in plan view in Fig. 7 and is more fully disclosed in copending application Serial No. 142,795, now Patent 2,737,809. Briefly, it comprises a plurality of thermocouples 50a, the even-numbered junctions of which would ordinarily correspond with the hot junctions being cemented to a radiation receiver or target 51, while the odd-numbered junctions of the thermocouples which would normally correspond with the cold junctions, being cemented to the radiation receiver or target 52. The sensitive element 50 is supported from a ring 53 by means of a plurality of fine wires 54, two of which, 54a and 54b, form leads to the sensitive element 50. The ring 53 is suitably mounted in a radiant-energy detector head, which is in turn supported by a housing 55. As shown, the supporting wires 54 may comprise extensions of corresponding wires of the thermocouples extending diametrically of the ring 53 and attached at opposite ends thereto by suitable means such as cement indicated by the area 53a in Fig. 7. The output of the radiant-energy detector or radiation pyrometer 56 will be a function of the difference between the temperatures of the target areas or radiation receivers 51 and 52, and these temperatures will, of course, depend upon the intensity of the beams of radiant energy $J_1$ and $J_2$ respectively directed thereon.

As will be noted in Fig. 5, the radiation pyrometer 56 is provided with a mirror 57 disposed behind the target areas 51 and 52. Thus the stations I and II of Figs. 1–4 will appear to be reversed with radiant-energy beam $J_1$ being received by target area 51 and radiant-energy beam $J_2$ being received by target area 52. The illuminator 13 is energized from supply lines 61, 61 under the control of a circuit-controlling device shown as an adjustable impedance 62 which may be the commercial form of variable transformer sold under the trade-name "Variac." The illuminator 13 is disposed in the same position with respect to the work surface 10 as previously described in connection with the preceding figures, that is to say the illuminator 13 is so disposed with respect to the work surface such that there will be only one reflection in the radiant energy received by each detector thus leading to the simple expression of Equation 10 above where it was seen that equality of temperature in the two surfaces is obtained for zero output signal no matter what the value of the emissivity $E_1$ of the work surface or the emissivity $E_2$ of the illuminator. Thus in all the modifications of the present invention errors due to variable emissivity have been entirely eliminated in the measurement and/or control of surface temperature.

Though the sensitive element 50 may be connected to any suitable measuring device, it has been illustrated in Fig. 5 as applied to a galvanometer G forming a component part of a measuring instrument including a mechanical relay MR arranged to drive through a suitable mechanical connection indicated by the broken line 64, the circuit-controlling device 62. If the beam of radiant energy $J_1$ is of greater intensity than the beam $J_2$, the polarity of the output from the sensitive element will be in one direction, and the polarity will be in the opposite direction when the intensity of beam $J_2$ is greater than that of beam $J_1$. As will be recalled from Equations 1 and 2, $J_1 = J_1' + J_1''$ and $J_2 = J_2' + J_2''$. The galvanometer G will deflect to the right or to the left depending upon the polarity and the mechanical relay MR will drive the variable transformer 62 in a direction to change the energization of the illuminator 13 in a direction to change the intensity of the beam $J_2$ to make it approach the intensity of the beam $J_1$. When radiant energy beams $J_1$ and $J_2$ have the same intensity, it is to be emphasized that black-body conditions of measurement have not been established and thus a radiation pyrometer calibrated for black-body measurement upon receiving the radiant-energy beam $J_1$ or the beam $J_2$ would not provide an indication of the true temperature of either the work surface or the illuminator. However, since the thermocouple 14 does provide a direct and true measurement of the temperature of illuminator 13, it will likewise provide a true measurement of the temperature of the work surface 10 when the radiant-energy beams $J_1$ and $J_2$ are equal. The thermocouple 14 has been illustrated in Fig. 5 as connected into a measuring circuit including a galvanometer $G_1$ which through a mechanical relay $MR_1$ adjusts a slidewire 65 relative to its stationary contact and at the same time drives a pen and indicator 66 relative to a recorder chart 67 to indicate with reference to a scale 68 the true temperature of surface 10 and to leave a record thereof on the chart 67.

In the radiation pyrometer 56 of Figs. 5 and 6 the illuminator 13 may be supported adjacent the work surface 10 by means of a bracket 70 supported by the housing 55 of pyrometer 56. As illustrated the preferable angular relationship between the work surface and the illuminator 13 is with the illuminator supported at approximately 90° with or perpendicular to the work surface 10. In this manner there is provided an adequately wide angle of view for the differential radiant-energy detector 50 or for a pair of radiant-energy detectors 31 and 32, Figs. 2 and 3, as at stations I and II and there is assured that there will be only one reflection in the radiant energy received by the detector at each of stations I and II. The pyrometer assembly 56 as a whole may be supported from a stationary member 71 encircling a rod 72 to which the housing 55 is pivotally connected by bracket 73.

With the illuminator perpendicular to the work surface, the line of sight from stations I and II with respect to the work surface and illuminator surface has been illustrated as about 34°. However, it is to be understood that this is not the only position at which the stations I and II may be located. For example, station I may be so located that its line of sight with respect to the work surface will be about 30° and station II may be so located that its line of sight with respect to the illuminator surface will be about 60°. Likewise station I may be so positioned that it will have a line of sight with respect to the work surface of about 60° and station II will have a corresponding line of sight with respect to the illuminator surface of about 30°.

While the preferred angular relationship between the work surface 10 and the illuminator 13 has been illustrated in Figs. 1–6, it is to be understood that the illuminator need not be supported perpendicular to the work surface 10 nor is it necessary that the lines of sight from stations I and II be parallel to each other. The essential requirement is that the illuminator, the work surface and the two detecting stations be so disposed with respect to each other that a detector located at one station will receive an emitted component directly from a limited area of the work surface and a reflected component emitted by the illuminator surface and reflected from the limited area of the work surface and that a detector located at the other station will receive an emitted component directly from the illuminator surface and a reflected component emitted by the limited area of the work surface and reflected from the illuminator surface. Thus as illustrated diagrammatically in Fig. 8, the lines of sight from stations I and II may be crossed with respect to each other rather than parallel as illustrated in the preceding figures.

In one application of the invention there was utilized an illuminator made of iron and supported at right angles to and about one inch above the work surface. The illuminator was one and one-half inches long, one and one-half inches wide and one-eighth inch thick. It was provided with platinum wires extending transversely through the plate parallel to the large surfaces for heating the illuminator to vary its temperature. Two radiant-energy detectors of the type disclosed in Dike Patent No. 2,232,594 were disposed at separate detecting stations, the angle of sight of each instrument being approximately 45° with respect to the work surface. One instrument was sighted on the work surface and the other instrument was sighted on the illuminator surface. Both instruments were disposed about twelve inches from their respective target areas. Each instrument was focused to view about a one-half inch circle normal to its axis, the area being viewed on the respective surfaces being in the form of an ellipse due to the angular disposition of the line of sight of the instrument with respect to the corresponding surfaces. In another application the illuminator utilized comprised a strip of platinum about one and one-half inches wide, one and five-eighths inches long and about .0001 inch thick. The time constant of this illuminator was about one second and the illuminator was heated by passing current directly through it.

For optimum results it was found that it is preferable that the work surface and the illuminator surface both be substantially plane and substantially specular. Also it has been found that when a single reflection between the illuminator surface and the work surface is utilized in establishing equality between the radiant-energy beams $J_1$ and $J_2$ directly respectively to detecting stations I and II, any non-uniformity in temperature measurements due to reflections from non-specular surfaces are minimized.

In the modification of Fig. 6 the differential output from the sensitive element 50 may be applied to a suitable control device 74 which may include an amplifier for controlling the temperature of the work 10 or other conditions of a process in which temperature is important. The thermocouple 14 and a heater controller 75 which may be of any suitable type similar to the heater controller 40 of Fig. 4, are utilized to maintain the illuminator 13 at a predetermined temperature as at the control point. Thus if the temperature of surface 10 varies from the control point, the controller 74 will function to regulate a valve 76 to regulate the steam which may be utilized for heating the work surface 10. The valve 76 is to be taken as representative of any control device, such for example as the variable transformer 62, and the like.

It will be observed that the arrangement of Fig. 6 is not the only manner in which that system may be applied to control the temperature of surface 10. In Fig. 5, for example, the mechanical relay $MR_1$ may be utilized to operate switch contact 78 to open and close the control circuits, the switch 78 being intended symbolically to represent suitable control structure such as shown in Ross et al. Patent No. 2,096,064.

Summarizing the foregoing, the present invention provides a method of accurately measuring and/or controlling the true temperature of a heated body or work surface without physical contact therewith and in avoidance of errors due to variable emissivity and absorption effects in the line of sight of radiation therefrom. It is to be emphasized that such method is performed without the necessity of establishing black-body measuring conditions thus eliminating the numerous precautions that must be observed in black-body temperature measurements and greatly simplifying the equipment utilized.

It has been shown above that the present invention may be embodied in various forms of equipment of substantially different nature. For example, the invention includes the utilization of a single radiant-energy detector moved alternately between two detecting stations for receiving a radiant-energy beam at one of the stations comprising radiant energy emitted by a limited area of the work surface and radiant energy emitted by an auxiliary surface and reflected from the limited area of the work surface and for receiving a radiant-energy beam at the other detecting station comprising radiant energy emitted by the auxiliary surface and radiant energy emitted by the limited area of the work surface and reflected from the auxiliary surface. To establish equality between the beams of radiant energy the temperature of one of the surfaces is varied, depending upon whether the operation being performed is measuring or controlling, until a condition of equality exists as detected at the two stations. Since the two surfaces will have the same temperature when the aforesaid condition of equality exists and since the temperature of one of the surfaces is likewise known, the temperature of the other surface will then be determined by reference to the known temperature.

The present invention may also be employed in a system utilizing two radiant-energy detectors having matched output characteristics, one detector being disposed at each of the two detecting stations. The outputs of the two detectors may be compared to determine when they have equal outputs or the two detectors may be connected differentially so that their combined output will be zero when the detectors are receiving radiant-energy beams of equal intensity.

Further the radiant-energy detector may be in the form of a radiation pyrometer including in a single housing a differential thermopile including two sensitive areas and exhibiting a zero output when the intensity of the beams of radiant energy directed to each of the sensitive areas are equal. This double beam pyrometer has the additional advantage over the other arrangements that only a single pyrometer or equivalent radiant-energy detector is utilized and there is avoided the necessity as in connection with the arrangement of Fig. 1 of moving the pyrometer from one station to the other and vice versa.

In all of the foregoing arrangements the auxiliary surface or illuminator may be in the form of a flat metal strip, such for example as a strip of platinum with the current passed directly therethrough. The illuminator may also take the form of an aluminum plate housing therein a heater unit to provide substantially uniform heating of the illuminator surface. In all cases the illuminator or auxiliary surface will have an emissivity less than unity and radiant energy will be reflected from it. Thus the auxiliary surface may be considered as an illuminator-reflector. In all of the modifications illustrated, the illuminator is disposed at an angle with respect to the work surface and with respect to the two detecting stations such that there will be a single reflection of the radiant energy interchanged between the work surface and the adjacent illuminator surface so that the beams of radiant energy received by detectors at the detecting stations include a reflected component made up of radiant energy from a single reflection between the aforementioned surfaces.

As above stated, the essential requirement regarding relative disposition of the illuminator, the work surface and the two detecting stations is that the illuminator, the work surface and the two detecting stations be so disposed with respect to each other that a detector located at one station will receive an emitted component directly from a limited area of the work surface and a reflected component emitted by the illuminator surface and reflected from the limited area of the work surface and that a detector located at the other station will receive an emitted component directly from the illuminator surface and a reflected component emitted by the limited area of the work surface and reflected from the illuminator surface.

Provided that the above essential requirement is met, dispositions of the work surface, illuminator and radiant-energy detectors providing more than one reflection between the work surface and illuminator are within the scope of the present invention: there is reason to believe that any small odd number of reflections afford correction for variable emissivity but the arrangements providing a single reflection are preferred.

While the various embodiments of the invention have been described in connection with the use of a thermocouple for measuring the temperature of the illuminator, it is to be understood that other suitable direct temperature-measuring apparatus may be substituted for the thermocouple. For example, by using an illuminator comprising strip material having a temperature coefficient of resistance, with electric current passed directly therethrough, the temperature-sensitive device for measuring the temperature of the illuminator may take the form of a resistance thermometer wherein a section of the illuminator strip is utilized as a resistance element of the resistance thermometer. In order to avoid errors in measurement due to terminal effects, the resistance thermometer leads may be attached to the illuminator at spaced locations intermediate the extremities of the illuminator strip. Thus it will be seen that the temperature of the illuminator in applicant's invention need not be measured by a thermocouple but may be measured by any suitable means that will give a direct and accurate measurement of the illuminator temperature.

In the specification and claims the terms "heated body," "heated work surface" or "work surface" are used to define any body or surface from which radiant energy is emitted whether or not associated with heating means, and the reference in the claims to control of the heating of the illuminator or auxiliary surface or of the work surface is to be taken as generic to either a heating or a cooling means associated therewith, or both, depending upon the direction of a temperature change required to bring the auxiliary surface or the work surface to the same temperature.

It shall be understood that the invention is not limited to the specific arrangements shown and that changes and modifications may be made within the scope of the appended claims.

What is claimed is:

1. An emissivity-independent pyrometer system for use with an adjustably heated work surface under non-black-body conditions and without physical contact therewith comprising a heated illuminator plate, said plate having an emissivity less than unity, means supporting said plate with one surface thereof adjacent a limited area of the heated work surface thereby to effect a cooperative relation between said surfaces for reflection by one of radiant energy emitted by the other, radiant-energy responsive means having different electrical outputs for different radiant energy inputs disposed to view separately and directly said one surface of said plate and said limited area of said work surface, the relative disposition of said radiant-energy responsive means, said plate, and the work surface being such that the beam of radiant energy received by said radiant-energy responsive means directly from said limited area of the work surface comprises radiant energy emitted thereby and radiant energy emitted by the adjacent surface of said plate and reflected from said limited area, the beam of radiant energy received by said radiant-energy responsive means directly from said plate comprising radiant energy emitted thereby and radiant energy emitted thereby and radiant energy emitted by said limited area and reflected from the adjacent surface of said plate, means responsive to said electrical outputs for determining when said beams are of equal intensity, means for adjusting the temperature of a selected one of said surfaces to vary the intensity of both of said beams in accordance with the response of said responsive means to the difference in said electrical outputs for establishment of equality of intensity of said beams, and means thermally associated with said illuminator plate for measuring the temperature of said plate as a replica of the temperature of the work surface upon establishement of said equality between said beams.

2. An emissivity-independent pyrometer system according to claim 1 for controlling the temperature of a heated work surface wherein said temperature adjusting means includes means to maintain said illuminator plate at a constant temperature and means to adjust the temperature of said work surface to bring the temperature of said work surface to the same temperature as that of said illuminator plate and establish equality of said beams.

3. An emissivity-independent pyrometer system according to claim 1 for measuring the temperature of a heated work surface wherein said temperature adjusting means includes means to adjust the temperature of said illuminator plate to bring the temperature of said illuminator plate to the same temperature as that of said heated work surface and establish equality of said beams.

4. A pyrometer system according to claim 1 wherein said radiant-energy responsive means comprises a pair of radiant-energy detectors which are matched and connected in series-opposition.

5. A pyrometer system according to claim 1 wherein said illuminator plate and said radiant-energy responsive means are both disposed within a housing, said illuminator plate being supported therein so as to be disposed at approximately right angles with respect to the surface whose temperature is to be measured.

6. A pyrometer system according to claim 1 wherein said illuminator plate comprises a thin strip of platinum having connections with said temperature adjusting means for passage of electric current through said strip.

7. A pyrometer system according to claim 6 wherein there is provided a resistance thermometer included in said means for measuring the temperature of said illuminator plate and a section of said platinum strip is utilized as a resistance element of the resistance thermometer.

8. A pyrometer system according to claim 1 wherein said radiant-energy responsive means comprises a differential thermopile, having a pair of radiation receivers.

9. A pyrometer system according to claim 1 wherein said illuminator plate has a thermocouple in thermal contact therewith included in said means for measuring the true temperature of said illuminator plate as a replica of the true temperature of said work surface when said conditions of equality have been established.

10. An emissivity-independent pyrometer system for measuring the true temperature of a heated work surface under non-black-body conditions comprising an illuminator-reflector, means for variably heating said illuminator-reflector to change the temperature thereof, and its radiant energy output, means for supporting said illuminator-reflector with one surface thereof directly adjacent a limited area of the heated work surface, a radiant-energy responsive detector movable between two stations having predetermined locations, said radiant-energy responsive detector at one of said stations being in predetermined location for directly viewing said one surface of said illuminator-reflector and receiving a beam of radiant energy therefrom comprising radiant energy emitted by said one surface of said illuminator-reflector and radiant energy emitted by the adjacent surface of said limited area of the work surface and singularly reflected from said illuminator-reflector, the radiant-energy responsive detector at said other station being in said other predetermined location for directly viewing said limited area of the work surface and receiving therefrom a beam of radiant energy comprising radiant energy emitted by said limited area of the work surface and radiant energy emitted by the adjacent surface of said illuminator-reflector and singularly reflected from said limited area, means for determining when said radiant energy beams are of equal intensity, and temperature-sensitive means for measuring the true temperature of said illuminator-reflector as a replica of the true temperature of the work surface when the beams of radiant energy received by said radiant-energy detector at said two stations are of equal intensity as indicated by said determining means.

11. An emissivity-independent pyrometer system for controlling the temperature of an adjustably heated work surface under non-black-body conditions and without physical contact therewith comprising an illuminator plate, means for heating said plate to a predetermined temperature, said plate having an emissivity less than unity, means supporting said plate with one surface thereof adjacent a limited area of the heated work surface thereby to effect a cooperative relation between said surfaces for reflection by one of radiant energy emitted by the other, radiant-energy responsive means having different electrical outputs for different radiant energy inputs disposed to view seperately and directly said one surface of said plate and said limited area of said work surface, the relative disposition of said radiant-energy responsive means, said plate, and the work surface being such that the beam of radiant energy received by said radiant-energy responsive means directly from said limited area of the work surface comprises radiant energy emitted thereby and radiant energy emitted by the adjacent surface of said plate and reflected from said limited area, the beam of radiant energy received by said radiant-energy responsive means directly from said plate comprising radiant energy emitted thereby and radiant energy emitted by said limited area and reflected from the adjacent surface of said plate, means responsive to said electrical outputs for determining when said beams are of equal intensity, means for adjusting the temperature of said work surface to vary the intensity of both of said beams in accordance with the response of said responsive means to the difference in said electrical outputs for establishment of equality of intensity of said beams to bring the temperature of said work surface to the same predetermined temperature of said illuminator plate upon establishment of said equality between said beams.

12. An emissivity-independent pyrometer system for measuring the true surface temperature of a heated work surface under non-black-body conditions comprising an luminator-reflector, means for variably heating said illuminator-reflector to change the uniform temperature thereof, and its radiant energy output, means for supporting said illuminator-reflector with one surface thereof adjacent a limited area of the heated work surface, a pair of radiant-energy sensitive receivers connected differentially and disposed for one receiver to view said limited area of the work surface and the other receiver to view said one surface of said illuminator-reflector, the relative disposition of said radiant-energy sensitive receivers, said illuminator-reflector and the work surface being such that the beam of radiant energy received by said one of said radiant-energy sensitive receivers from said limited area of the work surface comprises radiant energy emitted thereby and radiant energy emitted by the adjacent surface of said illuminator-reflector and reflected from said limited area, the beam of radiant energy received by said other radiant-energy sensitive receivers from said illuminator-reflector comprising radiant energy emitted thereby and radiant energy emitted by said limited area and reflected from said illuminator-reflector, and temperature-sensitive means for measuring the true temperature of said illuminator-reflector as a replica of the true temperature of the work surface when the beams of radiant energy are of equal intensity as determined by zero output from said differentially-connected radiant-energy sensitive receivers.

References Cited in the file of this patent

UNITED STATES PATENTS

| 2,275,265 | Mead | Mar. 3, 1942 |
| 2,562,538 | Dyer | July 31, 1951 |
| 2,690,078 | Phillips | Sept. 28, 1954 |
| 2,737,809 | Fastie | Mar. 13, 1956 |

FOREIGN PATENTS

| 640,711 | Great Britain | July 26, 1950 |

OTHER REFERENCES

Instruments, pages 417 and 418 of "Instruments" magazine, dated May 1948.